Nov. 18, 1969  R. J. RUNGE  3,479,581
VERTICAL RESISTIVITY LOGGING BY MEASURING THE ELECTRIC
FIELD CREATED BY A TIME-VARYING MAGNETIC FIELD
Filed Aug. 24, 1967  3 Sheets-Sheet 1

INVENTOR
RICHARD J. RUNGE
BY P.E. Johnston
Ralph L. Freeland Jr.
ATTORNEYS

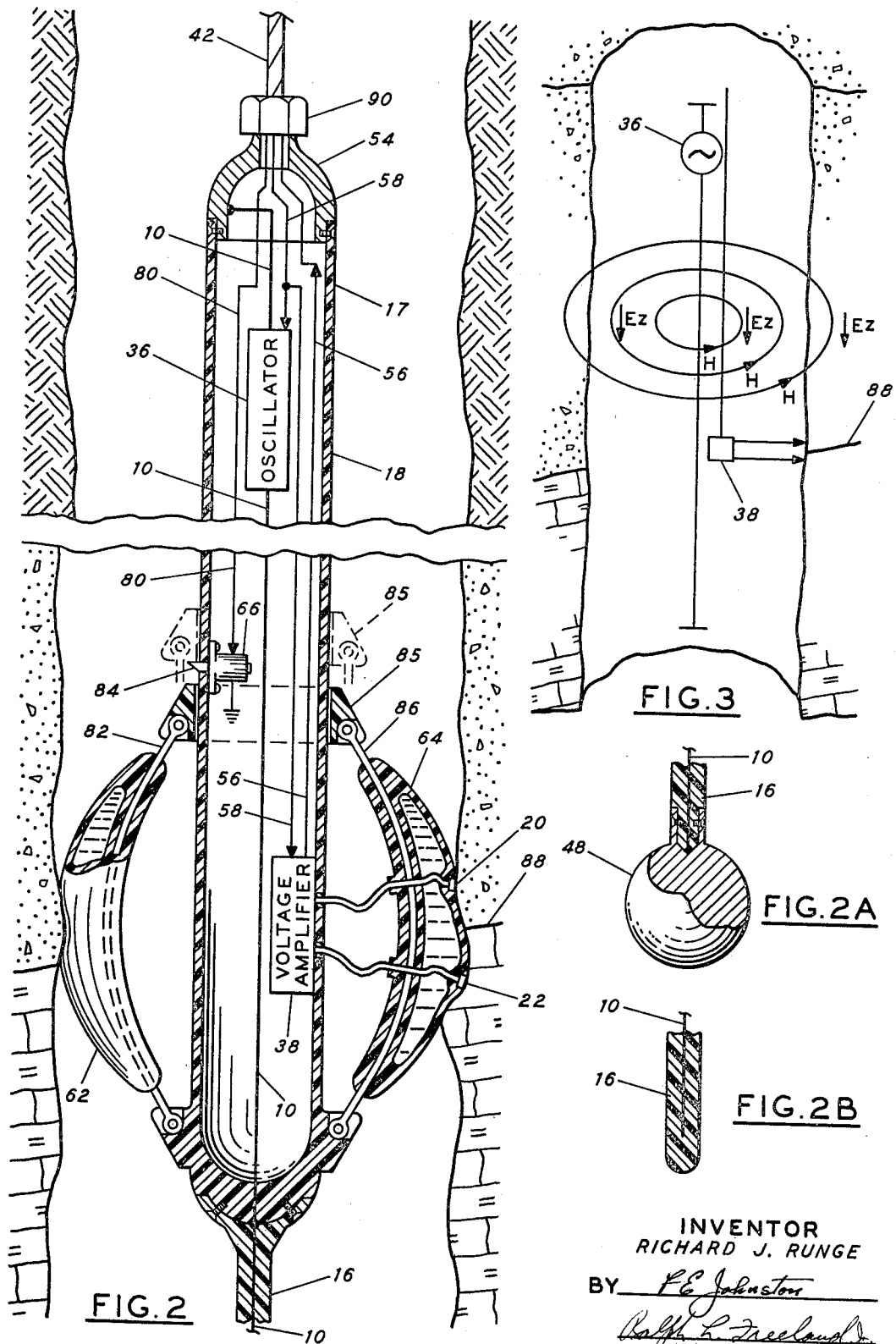

INVENTOR
RICHARD J. RUNGE
BY
ATTORNEYS

United States Patent Office 3,479,581
Patented Nov. 18, 1969

3,479,581
VERTICAL RESISTIVITY LOGGING BY MEASURING THE ELECTRIC FIELD CREATED BY A TIME-VARYING MAGNETIC FIELD
Richard J. Runge, Anaheim, Calif., assignor to Chevron Research Company, San Francisco, Calif., a corporation of Delaware
Filed Aug. 24, 1967, Ser. No. 662,981
Int. Cl. G01v 3/12
U.S. Cl. 324—6                    11 Claims

ABSTRACT OF THE DISCLOSURE

A vertical resistivity borehole logging system using an elongated current dipole to create a time-varying magnetic field in earth formations traversed by the borehole that induces a uniform electric field varying in accordance with the vertical (across the bedding) conductivity or resistivity of the earth formations which is measured by potential electrodes. As distinguished from (1) conventional electrical logging (using low frequency or D.C.), or (2) induction logging (using high frequency) both of which inherently measure only the horizontal resistivity perpendicular to the borehole, the present method measures vertical resistivity in the direction parallel to the axis of the borehole.

---

This invention relates to the art of electric borehole logging and more particularly to a new method for determining the resistivity parallel to the borehole in an anisotropic medium.

It is a primary object of this invention to measure the vertical resistivity of electrically anisotropic earth formations surrounding a well bore. Conventional electric and induction logging techniques are known to measure in such electrically anisotropic formations only resistivity in a direction perpendicular to the borehole, and generally along the horizontal bedding; this resistivity is called the horizontal resistivity. The phenomenon is commonly called the paradox of anisotropy (see Kunz and Moran, Some Effects of Formation Anisotropy on Resistivity Measurements in Boreholes, Geophysics, vol. XXIII, No. 4 October 1958, pp. 770–794 at p. 775). For isotropic media this paradox poses no problem and conventional techniques will suffice to determine resistivity. But due to this paradox there has previously been no way to known the vertical resistivity in such an anisotropic medium and thus no means of determining the coefficient of anisotropy $\lambda$ in an anisotropic medium, where $$\lambda = \sqrt{R_V/R_H}$$

in which $R_V$ = vertical resistivity
$R_H$ = horizontal resistivity.

It will be evident that the anisotropy can readily be obtained once the vertical resistivity is measured because the horizontal resistivity is easily measured by conventional techniques.

Recent developments in the art of electric logging and in particular developments disclosed in Runge et al. U.S. Patent 3,256,480 concerning an ultra-long-spaced electric logging system (hereinafter referred to as the ULSEL method) indicates the desirablility of knowing the lithologic parameter of anisotropy. For example, it has been found that under certain conditions of electrical anisotropy it is difficult to compute the distance to a body of high electrical impedance without knowing this coefficient of anisotropy. As stated in lines 72–75 of column 6 in the specification of this patent, the apparent distance to a salt body (or other body of significantly different resistivity than the formations surrounding a well bore) in a homogeneous, isotropic medium is given by the formula $$\frac{\rho_S}{\rho} = 1 + \frac{1}{\sqrt{1 + \left(\frac{4X^2_{AP}}{A^2}\right)}}$$

where $\rho$ = the resistivity measured in the absence of a salt body
$\rho_S$ = the resistivity measured in the presence of a salt body
$A$ = the spacing between the nearest long spaced potential electrode and the current electrode in the ULSEL method
$X_{AP}$ = the apparent distance to a salt body.

The relationship between the apparent distance, $X_{AP}$, given in this formula, and the actual distance, $X_0$, in an anisotropic medium is known to be $X_{AP} = X_0/\lambda$, where $\lambda$ is composed of components due to both the microscopic anisotropy within stratigraphic layers and macroscopic anisotropy caused by successive stratigraphic layers with different conductivities. Knowledge of the microscopic anisotropy and a mapping of stratigraphic layers allows the composite $\lambda$ to be computed and accurate lateral distance measurements to be made by the ULSEL method. It is also possible to modify and improve the model on which the ULSEL method is based with a knowledge of the microscopic anisotropy.

If there is a dip in the beds near a body of high electrical impedance then macroscopic anisotropy may obscure the data obtained under the ULSEL method. By analyzing the effect of dip on the interpretation of data obtained by applying this method, it can be shown that for sediments dipping at some angle away from the axis of a borehole, a knowledge of the composite anisotropy is useful in interpreting ULSEL data.

Knowledge of the anisotropy is also useful in differentiating between sand beds, which are isotropic, and shale beds, which are anisotropic. A method of determining the true value of the coefficient of anisotropy, in effect, serves as a sand-shale meter. Also, sand which contained shale as an impurity or which has been invaded by other foreign substances has a coefficient of anisotropy different from unity. By analyzing and comparing data it is possible to estimate accurately the constitution of beds of sand.

It is therefore a primary object of this invention to measure electrical resistivity in a direction parallel to a well bore by circumventing the paradox of anisotropy.

The general formula describing an electric field can be expressed as $$\vec{E} = -\nabla\phi - \frac{\partial \vec{A}}{\partial t}$$

where the first term on the right-hand side of the equation is the divergence of the scalar potential and the second term is the rate of change of the vector potential with time. For electric logging purposes the first term can be called the potential component of the electric field and may be due to the current which is injected into the formations surrounding a well bore by the current electrodes used in conventional electric logs. For electric logging purposes the second term can be called the induced component of the electric field and in accordance with the method of this invention is induced in the formations surrounding a well bore by a time varying electromagnetic field; in conventional electric logs the second component is negligible because there is no significant time-varying magnetic field associated with the logging sonde. It can be seen, then, that the potential field $-\nabla\phi$ is the one that is utilized in conventional electric logs to measure resistivity. However, it is a strange fact of nature that this potential field cannot be used in conventional electric logging to measure vertical resistivity. The potential field is directly dependent on the current flow and it can be mathematically demonstrated that the current distribution associated with a conventional electric log shifts if the vertical resistivity is varied and that this shift is such that the potential measured between two electrodes remains constant as the vertical resistivity is varied. Thus the paradox of anisotropy is grounded on the insensitivity of the potential field to changes in the vertical (parallel to the bore hole) resistivity when measured along the vertical.

The present invention circumvents the paradox of anisotropy by either (1) rendering the potential field insignificant in comparison to the induced field, or (2) eliminating the potential field altogether and creating a significant induced field; these two embodiments of the invention will be denoted as the first and second embodiments, respectively.

Briefly stated, the method of the present invention comprehends establishing a substantially uniform, time-varying electromagnetic field over an elongated depth interval in earth formations surrounding a well bore to induce a circularly uniform vertical electric field near the center of said depth interval, and then detecting the potential difference between a pair of electrodes spaced a given vertical distance apart near the center of said depth interval as an indication of the resistivity of earth formations in a direction parallel to the well bore and characteristic of the vertical resistivity of such formations.

Further objects and advantages of the present invention will become apparent from the following detailed description of the method and its application.

In the drawings:

FIGURE 2 is a side elevation view, partially in section of the upper half of apparatus shown in FIGURE 1 for practicing the first embodiment of this invention.

FIGURE 2A is a view, partially in section, of the lower end of the apparatus shown in FIGURE 1.

FIGURE 2B is a cross-sectional view of the lower end of the apparatus of FIGURE 1 modified to the non-conductive form of the second embodiment.

FIGURE 3 schematically illustrates the magnetic field created by a current oscillating in a dipole antenna and the corresponding induced electric field, useful in a theoretical explanation of the method of the invention.

Figure 4:
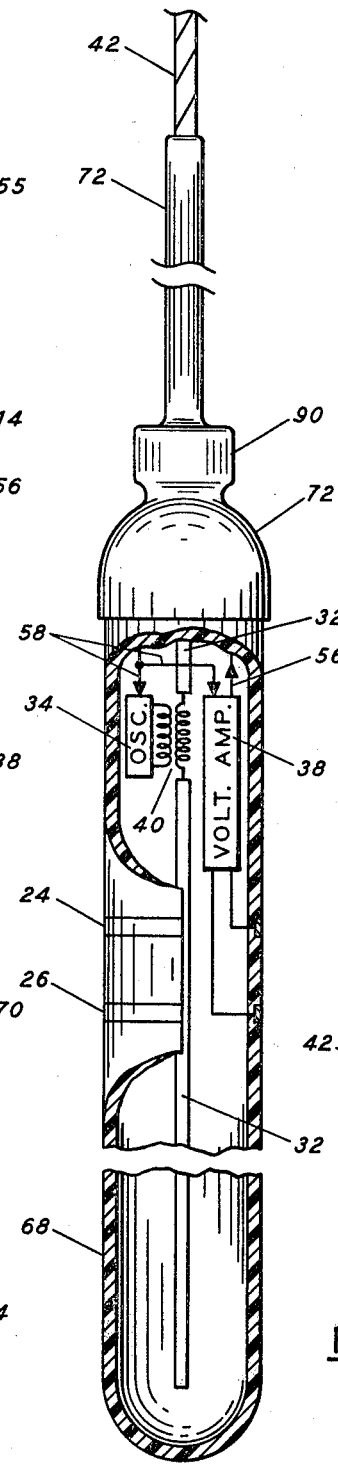

FIGURE 4 is a side elevation view partially in cross-section of an alternative form, or second embodiment, of apparatus suitable for practicing the method of the present invention, wherein the upper half of the dipole antenna is wrapped around the logging cable.

Figure 4A:
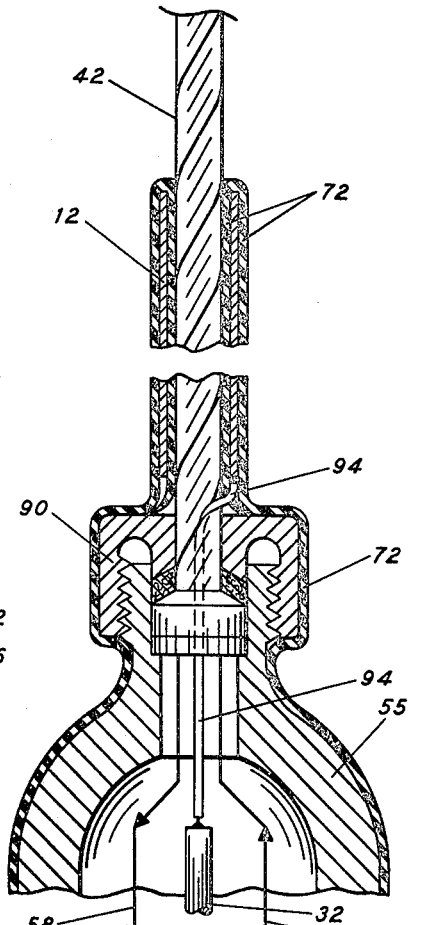

FIGURE 4A is a cross-sectional view of the bridle and the upper portion of the dipole antenna of the apparatus shown in FIGURE 4.

Figures 4B, 4C:
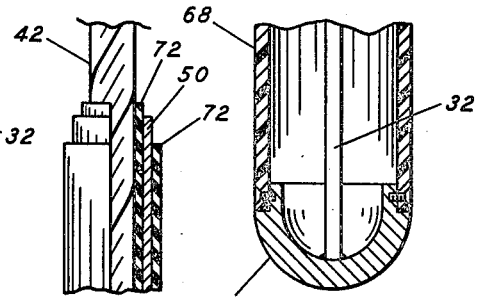

FIGURES 4B and 4C represent the upper and lower ends, respectively, of the apparatus of FIGURE 4 when the method of the invention is practiced using the first embodiment.

Figure 5:
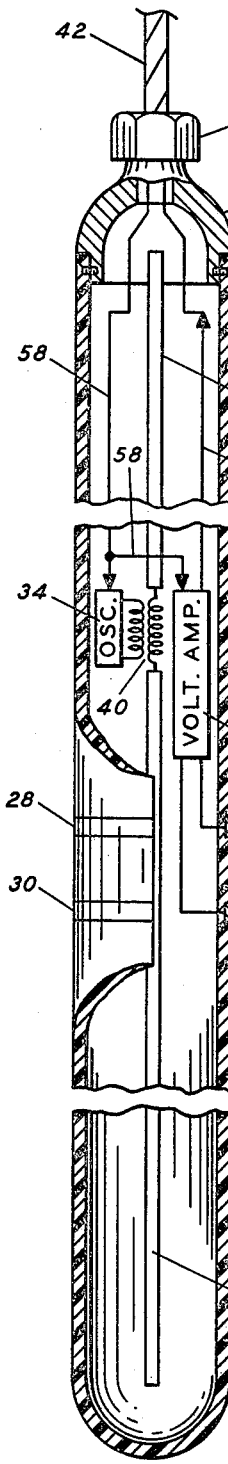

FIGURE 5 is a cross-sectional view of an alternative form of apparatus for practicing the second embodiment wherein the logging sonde is a single unit.

In both embodiments of the present invention a dipole antenna system from 30 to 100 feet long is utilized to produce a time varying magnetic field which induces a vertical electrical field in the formations surrounding the well bore. Since the current oscillating in the dipole antenna is vertical, the induced electric field is also vertical in the formations. Once this vertical induced field dominates or replaces the potential field a measurement of the potential between two potential electrodes will measure directly and simply the vertical resistivity of the surrounding formations.

The dipole antenna can have several forms such as thin wire 10 in FIGURE 2, cylindrical rod 32 in FIGURES 4 and 4A, or cylindrical rod 14 in FIGURE 5. The dipole antenna can be driven directly as shown in FIGURE 2 by a direct tie-in of oscillator 36 to thin wire antenna 10; or the dipole antenna can be driven by inductive coupling as shown by the pair of coupled coils 40 in FIGURES 4 and 5. In order that the maximum current oscillates in the antenna it is desirable that the coils be matched so that a resonance circuit is obtained.

Figure 1:
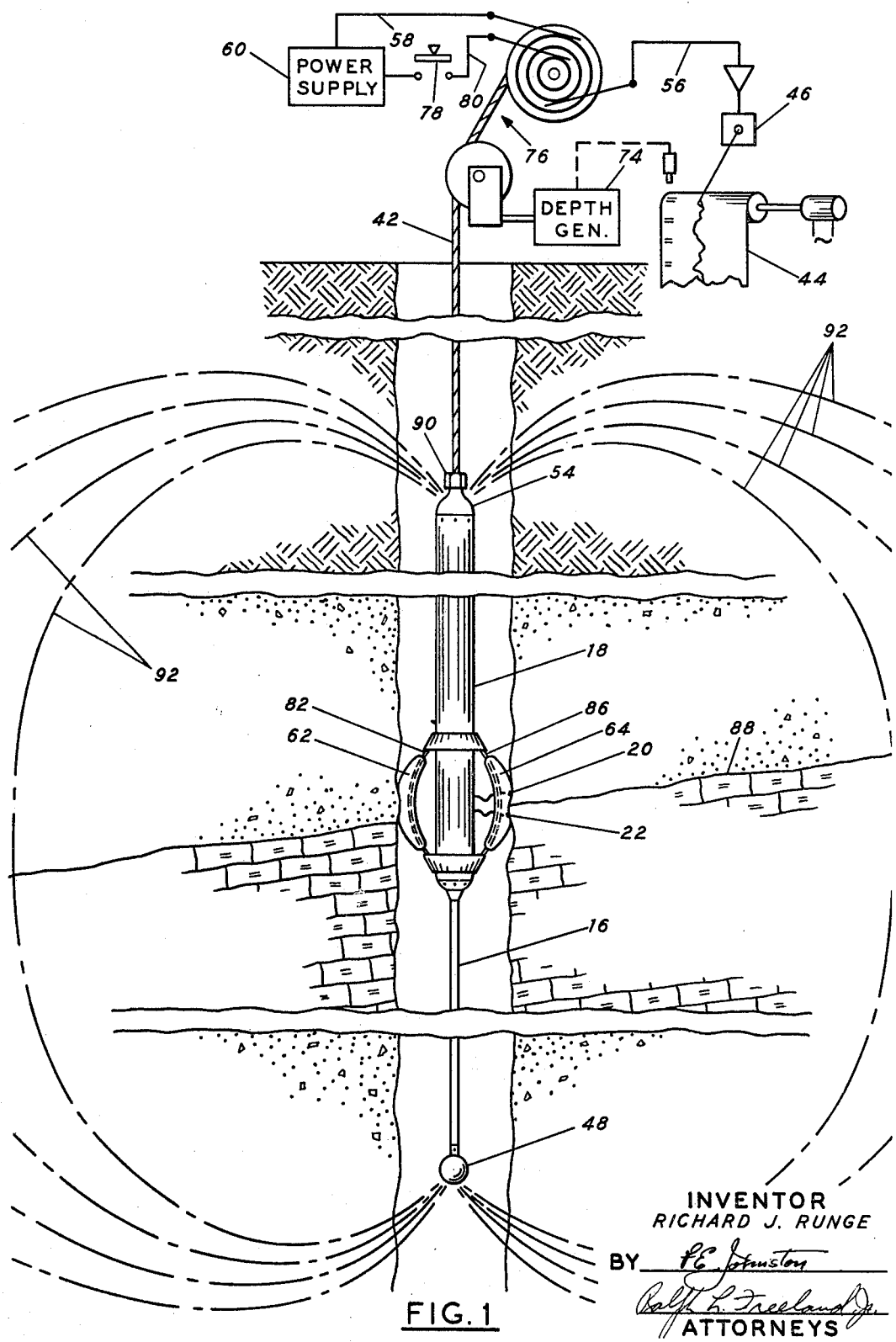
FIGURE 1 is a schematic representation of a logging system illustrating the first embodiment for practicing the method of the present invention.

In a first embodiment of the present invention the induced field is made to dominate the potential field by fixing the parameters of a sonde so that the ratio of the absolute value of the induced field to the absolute value of the potential field is made greater than 20 in the region in which the measuring electrodes are placed. This first embodiment of the invention is illustrated by FIGURE 1, FIGURES 2 and 2A, and by FIGURES 4B and 4C when viewed in conjunction with FIGURE 4. As is readily apparent the primary physical difference between the second embodiment and the first embodiment is that the ends of the dipole antenna are insulated in the second embodiment, as illustrated by fiberglass insulation 16 in FIGURE 2B, insulated cylindrical rod 14 in FIGURE 5, insulated cylindrical rod 32 in FIGURE 4 and by insulated cylindrical sheath 12 in FIGURE 4A. On the other hand, the ends of the dipole antenna are in electrical contact with the surrounding formations in the first embodiment, as illustrated by spherical current electrode 48 in FIGURES 1 and 2A, conducting head 54 in FIGURES 1 and 2, exposed upper end 50 of cylindrical shell 72 in FIGURES 4A and 4B, and lower current electrode 52 in FIGURE 4C. In these embodiments, current flows into and is received from the surrounding formations, as illustrated by current lines 92, in FIGURE 1. The physics of this difference is great because there is virtually no potential field at the ends of the dipole in the second embodiment, and the vertical resistivity can be measured without considering any effect due to the potential field. However, due to the formation current flow from the ends of the dipole in the first embodiment it is possible to drive a somewhat larger current in the dipole antenna than is possible in the second embodiment; thus, the induced field of the first embodiment is stronger than the induced field of the second embodiment.

It can be mathematically demonstrated that for the first embodiment the ratio of the absolute value of the induced field to the absolute value of the potential field in a limited region called the near central zone is given by $$\left|\frac{\vec{E_I}}{\vec{E_P}}\right| \simeq \frac{\pi\mu_0 f\sigma_0 L_0}{\sqrt{2}} \exp(L/2\lambda_0) \ln\left(\frac{\sqrt{2}\lambda_0}{r}\right)$$

where $\pi = 3.1416$ $\mu_0 =$ the permeability of free space $= 4\pi \times 10^{-7}$ henries/meter $f =$ the frequency in Hertz at which the dipole antenna system is driven $\sigma_0 =$ the conductivity in 1/(meters-ohm) of the formations surrounding the well bore $L =$ the total length of the dipole antenna system, in meters $\lambda_0 =$ the skin depth or the depth at which the scalar potential is reduced by the factor $1/e$ due to frequency related attenuation $= 504/\sqrt{f\sigma_0}$ meters $r =$ the distance away from the axis of the antenna system on a line bisecting the antenna, in meters.

The near central zone is defined to be the region in which the distance from the dipole antenna as well as the distance from an imaginary line bisecting the dipole antenna are both much less than one-half the total length of the dipole antenna. Potential measuring electrodes 20 and 22 in FIGURES 1 and 2 and band electrodes 24 and 26 in FIGURE 4 are located in this near central zone.

For the first embodiment it can be seen from the above ratio formula that the two parameters that can readily be varied are the frequency $f$ and the dipole length L. The ratio is highly responsive to changes in length because of the exponential relationship. Also, even though it would seem that the ratio could be enlarged by simply using a high frequency it is desirable to keep the frequency in the range of 100 kHz. to 1000 kHz. because the skin depth, $\lambda_0$, is inversely proportional to the square root of the frequency: the higher the frequency, the shorter the skin depth. And, as can be seen from the ratio formula, the ratio is proportional to the skin depth in a complicated way; the result is that the skin depth should not be made too small. The chart below shows the dependence of the ratio on the length at a point one-tenth of a meter from the axis of the antenna on a line bisecting the antenna if the frequency is set at 100 kHz. and if the medium has a vertical resistivity of 10 ohm-meters.

| $|\vec{E_I}/\vec{E_P}|$: | Length (L) in feet |
|---|---|
| 1300 | 131 |
| 360 | 98.5 |
| 89 | 65.5 |
| 40.5 | 49.3 |
| 24 | 39.4 |
| 19.8 | 36.1 |
| 16.3 | 32.8 |

For these particular conditions it can be seen that the sonde should not be less than 36 feet long if a ratio of 20 to 1 is to obtain.

The induced field that exists in both embodiments and which is shown in FIGURE 3 is vertical in the formations. As a result of this vertical property it can be shown that, for both embodiments, the vertical resistivity $\rho_V$ is given by the formula:

$$\rho_V = \exp\left(\frac{|\vec{E_Z}| - \alpha}{\beta}\right)$$

where $|\vec{E_Z}|$ = Absolute Value of the Vertical Component of the Electric Field Amplitude = Absolute Value of the Measured Electromotive Force divided by the Vertical Distance between the Measuring Electrodes $\alpha, \beta$ = Constants In both embodiments of the present invention power source 60, shown in FIGURE 1, supplies power via power line 58 shown in FIGURES 2, 4, 4A and 5, to an oscillator, shown as 36 in FIGURES 2 and 3, and as 34 in FIGURES 4 and 5, line 58 also supplies power to voltage amplifier 38, shown in FIGURES 2, 3, 4 and 5. The voltage measured by the potential electrodes and amplified by voltage amplifier 38 is transmitted via line 56, of cable 42, to a recorder, such as pen galvanometer 46, shown in FIGURE 1, to trace a record of the voltage on visual recording means, chart 44. Depth generator 74 indicates on chart 44 the depth at which the voltage was measured. Voltage amplifier 38 and oscillators 34 and 36 are constructed with a minimum of electromagnetically metallic parts to minimize any interference with the time varying magnetic field generated by the dipole antenna. Also, the voltage signal sent from voltage amplifier 38 via line 56 may be pulsed on a shared time basis with or altered in frequency from the current oscillating in the antenna to minimize pickup by line 56 from the oscillating magnetic field. Further, since the measured potential line 56 may pick up interference signals from power line 58 if an alternating power source is used, it is desirable for power supply 60 to be a source of direct current.

Cable 42 is a standard strength logging cable, used to move sonde 17 in the borehole; it is driven by a standard cable winch and motor combination designated schematically as 76 in FIGURE 1. Cable 42 is connected to sonde 17 by a standard cable head 90.

Sonde 17, housing the dipole antenna, may be constructed of any suitable non-magnetic and non-conducting material. In FIGURES 1 and 2 the housing is shown to be formed as molded rod 16 and molded cylindrical casing 18. In FIGURE 5, it is shown to be cylindrical housing 70, and in FIGURE 4 as cylindrical housing 68. A special advantage of the form of apparatus shown in FIGURE 4 is that only the lower half of sonde 68 has to be constructed as a special housing: The upper half of the dipole antenna is formed as cylindrical shell 12 insulated from cable 42 and from the borehole by rubber boot 72. The upper and lower halves of the antenna are connected by insulated wire 92 running through cable head coupling 90.

In running the sonde of FIGURES 1 and 2 into the borehole, deformable pads 62 and 64 are held out of contact with the walls of the well bore and the surrounding earth formations. For this purpose catch 84 on solenoid 66 holds deformable pads 62 and 64 away from the sides by compressing steel springs 82 and 86 by holding collar 85 in the phantom position of FIGURE 2. When the sonde is at the lowermost point in the borehole, switch 78 on the surface activates solenoid 66 via line 80 causing catch 84 to retract and release collar 85 so that springs 82 and 86 force deformable pads 62 and 64 against the formations to bring contacts 20 and 22 against the side wall of the bore hole. Such a position may be required if a highly resistive drilling fluid, such as an oil base or emulsion mud, is present in the well bore.

It is a further object of the present invention to operate as a new method of obtaining thin bed resolutions. In such operations, potential measuring electrodes 20 and 22, shown in FIGURE 1, or band electrodes 24 and 26, shown in FIGURE 4, and band electrodes 28 and 30, shown in FIGURE 5, can be less than two feet apart. Consequently, it is possible to detect with great accuracy the depth in the bore hole at which there is a shift in vertical resistivity to detect and interface such as 88, shown in FIGURES 1, 2 and 3. Since the paradox of anisotropy is circumvented by the method of the present invention, the potential measured by the electrodes in such an example is affected only by the vertical resistivity of the formations with which it is in direct physical contact. Thus anomalies at a lateral distance from the edge of the well bore do not hamper the near instantaneous detection of interfaces between beds with varying vertical resistivities. An important use, then, of this invention is to map thin bed stratigraphy where commercial accumulations of oil may be present.

It might be suspected that the properties of the drilling fluid in the borehole would have some effect on the measurement as described. In particular, it might be suspected that a drilling fluid of very low resistivity would have the effect of shorting out the potential measurement. However, a mathematical analysis, involving Maxwell's equations, taking into account expected operating conditions of the tool, typical mud resistivities, hole diameters, and formation resistivities, indicates that the effect of the hole is negligible over a considerable range of these parameters. By this is meant the electrical parameters, in particular, the conductivity of the mud, which is not expected to have values outside the range of 1 to 10 mhos per meter.

It is evident that other forms of apparatus may be used to practice the method of the present invention. Indeed, it is likely that individual aspects of the several forms illustrated in the drawings could be combined to produce new forms. In essence, however, they all would rely on the concept of circumventing the paradox of anisotropy by rendering the potential field insignificant in comparison to an induced electric field or by eliminating the potential field, and using only an induced electric field. The vertical resistivity is then measured as a simple function of the electromotive force between two potential electrodes.

All such modifications coming within the scope of the following claims are intended to be included therein.

I claim:

1. In electric logging of an earth formation exhibiting different electrical resistivities parallel and transverse to the bedding plane of said earth formation, a method of determining the resistivity of said earth formations parallel to a well bore traversing said earth formations over a known depth interval which comprises generating within said well bore a time-varying magnetic field extending vertically substantially above and below said known depth interval so that over said known depth interval said magnetic field forms circular lines of force surrounding said well bore, with the planes of said circles being substantially perpendicular to the axis of said well bore and the strength of said field being substantially uniform in the vertical direction over said depth interval, measuring an electrical characteristic of the electric field induced by said magnetic field between a pair of electrodes spaced a fixed vertical distance apart about the center of said electromagnetic field and within said known depth interval, and indicating said electrical characteristic over said fixed vertical distance as a measure of the resistivity of said earth formations parallel to said well bore.

2. A method of determining the resistivity of an earth formation parallel to a well bore over a known depth interval which comprises generating in said earth formation an elongated alternating current electromagnetic field extending a substantial distance above and below said known depth interval, so that the lines of force of said electromagnetic field over said known depth interval are substantially parallel to said well bore over said known depth interval, measuring an electrical characteristic of the induced electric field between a pair of electrodes spaced a fixed vertical distance apart near the center of said electromagnetic field and spanning said known depth interval, said electrodes being in electrical contact with said earth formation, and recording said electrical characteristic over said known depth interval in accordance with the depth of said electrodes in said well bore as an indication of the resistivity of said earth formation parallel to said well bore.

3. A method of determining the cross-bedding resistivity of earth formations traversed by a well bore which comprises traversing said well bore with an elongated antenna, driving said antenna at a frequency in the range of from about 100 kHz. to 1000 kHz. to establish an alternating current electrical field oriented substantially parallel to and over a substantial length along the axis of said well bore traversing said earth formations, and measuring between two points spanning a fixed distance short relative to the length of said electrical field and substantially symmetrical about the midpoint of said antenna an electrical characteristic of the electromotive force induced in said formations as an indication of the cross-bedding resistivity of said earth formations traversed by said well bore.

4. The method of claim 3 wherein said measured electrical characteristic is resistivity and said resistivity is recorded in accordance with the depth of said antenna in said well bore, with the additional steps of measuring the in-bedding resistivity of said formations and then indicating the true anisotropy of said formations in accordance with the measured cross-bedding and in-bedding resistivities over the same depth interval of said well bore from the formula:

$$\lambda = \sqrt{R_V/R_H}$$

where $\lambda$ = anisotropy
$R_V$ = vertical resistivity
$R_H$ = horizontal resistivity 5. A method in accordance with claim 3 wherein the ends of said elongated antenna are in electrical contact with said earth formations to pass current into and collect current from said earth formations during each reversal of current flow.

6. A method in accordance with claim 3 wherein the ends of said elongated antenna are insulated to prevent electrical current flow from said ends into and out of said earth formations.

7. A method of determining the vertical resistivity of earth formations at a known depth in, and immediately surrounding, a well bore which method comprises:

(a) traversing a known interval in said well bore with a dipole antenna having a length L, (b) electrically driving said antenna at a frequency $f$ so that the absolute value of the ratio of the induced electric field to the vertical component of the potential field is greater than 20 in the near central zone of said antenna system, said near central zone being within the distances from the center of said antenna system and the axis of said antenna system are both much less than $L/2$, said absolute value being given by the formula:

$$\left| \frac{\vec{E_I}}{\vec{E_P}} \right| \simeq \frac{\pi \mu_0 f \sigma_0 L_0}{\sqrt{2}} \exp(L/2\lambda_0) \ln\left(\frac{\sqrt{2}\lambda_0}{r}\right)$$

where $\pi = 3.1416$
$\mu_0$ = the permeability of free space = $4\pi \times 10^{-7}$ henries/meter
$f$ = the frequency in Hertz
$\sigma_0$ = the conductivity of said earth formations in mho/meter
L = the length of said dipole antenna system meters
$r$ = the distance away from the axis of said antenna system meters
$\lambda_0$ = the skin depth = $504/\sqrt{f\sigma_0}$ meters, (c) measuring the electromotive force between a pair of potential electrodes spaced a fixed vertical distance apart in said near central zone, and (d) recording the vertical resistivity $\rho_V$ of said earth formations spanned by said pair of electrodes as a function of said measured electromotive force in accordance with the formula:

$$\rho_V = \exp\left(\frac{\left|\vec{E_Z}\right| - \alpha}{\beta}\right)$$

where $E_Z$ = Absolute Value of the vertical component of the Electric Field Amplitude = Absolute Value of said Measured Electromotive Force divided by said Fixed Vertical Distance
$\alpha, \beta$ = Constants 8. A method of measuring over a known depth interval the true vertical resistivity of an earth formation traversed by a well bore which comprises inducing a uniform time-varying electromagnetic field extending sufficiently above and below said known interval of said formation to create circularly uniform lines of force that are substantially parallel to the axis of said well bore above and below said known interval, and then within said known interval, detecting with a pair of vertically spaced electrodes spanning said known interval an electrical characteristic of the resultant induced vertical electric field as a measure of the true vertical resistivity of said earth formation.

9. Apparatus for measuring the conductivity or resistivity of an earth formation parallel to the axis of a well bore penetrating said formation which comprises
(a) an elongated conductor element adapted to be positioned parallel to and over an extended length along the axis of said borehole,
(b) a source of alternating current having a frequency in the range of from about 100 kHz. to 1000 kHz.,
(c) means for connecting said source to said conductor element to generate a symmetrical electromagnetic field concentric with and uniformly perpendicular to the central portion of said conductor element,
(d) a pair of electrodes symmetrically positioned with respect to the mid-point of said conductor element and electrically insulated therefrom, said electrodes spanning only said central portion of said conductor element wherein the resultant electric field is substantially parallel to said conductor element,
(e) means for connecting potential measuring means to said electrodes to indicate the electrical potential across said pair of electrodes when said source and said conductor element are applying a time-varying electromagnetic field to earth formations,
(f) means for traversing said conductor element and said pair of electrodes through said well bore, and
(g) means for recording the output of said potential measuring means in accordance with the depth of said electrodes in said well bore to indicate the conductivity or resistivity of earth formations parallel to the axis of said well bore.

10. Apparatus in accordance with claim 9 in which said source of alternating current is an oscillator and said means for connecting said source to said conductor element is an inductive coupling.

11. Apparatus in accordance with claim 10 in which said inductive coupling is a resonance circuit at the frequency of said oscillator.

References Cited

UNITED STATES PATENTS

| | | | |
|---|---|---|---|
| 2,018,080 | 10/1935 | Martienssen | 324—5 |
| 2,159,418 | 5/1939 | Babcock | 324—1 |
| 2,169,685 | 8/1939 | Evten | 324—1 |
| 2,222,182 | 11/1940 | Mounce et al. | 324—5 XR |
| 2,404,622 | 7/1946 | Doan | 324—10 |
| 2,415,364 | 2/1947 | Mounce | 324—1 |
| 2,951,982 | 9/1960 | Schuster | 324—6 |
| 3,012,189 | 12/1961 | Doll | 324—3 XR |
| 3,087,111 | 4/1963 | Lehan et al. | 324—1 |
| 3,124,742 | 3/1964 | Schneider | 324—1 |
| 3,305,771 | 2/1967 | Arps | 324—6 |

GERARD R. STRECKER, Primary Examiner

U.S. Cl. X.R.

324—10